(12) United States Patent
Kikuchi

(10) Patent No.: US 8,629,074 B2
(45) Date of Patent: Jan. 14, 2014

(54) ZEOLITE HONEYCOMB STRUCTURE

(75) Inventor: Yoshio Kikuchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 238 days.

(21) Appl. No.: 13/069,753

(22) Filed: Mar. 23, 2011

(65) Prior Publication Data

US 2011/0237425 A1 Sep. 29, 2011

(30) Foreign Application Priority Data

Mar. 26, 2010 (JP) ................................. 2010-073193

(51) Int. Cl.
*B01J 29/068* (2006.01)
*B01J 35/04* (2006.01)

(52) U.S. Cl.
USPC ................. 502/65; 502/74; 502/77; 502/84; 428/116

(58) Field of Classification Search
USPC ............................ 502/65, 74, 77, 84; 428/116
See application file for complete search history.

(56) References Cited

U.S. PATENT DOCUMENTS

| | | | |
|---|---|---|---|
| 2005/0266992 A1 | 12/2005 | Ohno et al. | |
| 2008/0286184 A1* | 11/2008 | Ando et al. | 423/213.5 |
| 2009/0143221 A1* | 6/2009 | Ogunwumi et al. | 502/67 |
| 2009/0246103 A1 | 10/2009 | Ohno et al. | |
| 2009/0291840 A1* | 11/2009 | Ohno et al. | 502/74 |
| 2009/0311146 A1* | 12/2009 | Ohno et al. | 422/171 |
| 2009/0324454 A1* | 12/2009 | Nakano et al. | 422/177 |
| 2010/0196221 A1 | 8/2010 | Ando et al. | |
| 2011/0116988 A1* | 5/2011 | Kunieda et al. | 422/211 |

FOREIGN PATENT DOCUMENTS

| | | |
|---|---|---|
| EP | 1 847 320 A1 | 10/2007 |
| EP | 1 927 392 A1 | 6/2008 |
| EP | 2 123 354 A1 | 11/2009 |
| JP | 3285206 | 3/2002 |
| JP | 2008-279334 | 11/2008 |
| WO | 2009/118868 A1 | 10/2009 |

OTHER PUBLICATIONS

U.S. Appl. No. 13/050,302, filed Mar. 17, 2011, Yoshio Kikuchi.
U.S. Appl. No. 13/050,381, filed Mar. 17, 2011, Yoshio Kikuchi.
U.S. Appl. No. 13/052,352, filed Mar. 21, 2011, Yoshio Kikuchi.
U.S. Appl. No. 13/052,390, filed Mar. 21, 2011, Yoshio Kikuchi.

* cited by examiner

*Primary Examiner* — Jun Li
(74) *Attorney, Agent, or Firm* — Burr & Brown, PLLC

(57) ABSTRACT

The zeolite honeycomb structure is constituted of a zeolite raw material containing zeolite particles, noble metal loaded catalyst carriers containing a noble metal loaded onto catalyst carriers, and an inorganic binding material in a honeycomb shape. An average particle diameter of the noble metal loaded catalyst carriers is ten or more times an average particle diameter of the zeolite particles. Moreover, the noble metal loaded catalyst carriers are contained in an amount corresponding to a volume ratio which is from 5 to 25 vol % with respect to 100 vol % of the zeolite particles, and the noble metal is loaded onto the noble metal loaded catalyst carriers in an amount corresponding to a mass ratio which is from 0.2 to 2.0 mass % with respect to 100 mass % of the zeolite particles in the zeolite honeycomb structure.

7 Claims, 2 Drawing Sheets

ZEOLITE HONEYCOMB STRUCTURE

BACKGROUND OF THE INVENTION

1. Field of the Invention

The present invention relates to a zeolite honeycomb structure. More particularly, it relates to a zeolite honeycomb structure having a low pressure loss and an excellent $NO_x$ purification performance.

2. Description of the Related Art

It is known that zeolite is a type of silicate having a mesh crystal structure provided with fine pores having a uniform diameter, there are present various chemical compositions represented by the general formula: $W_m Z_n O_{2n} \cdot sH_2O$ (W: sodium, potassium, calcium or the like, Z: silicon, aluminum or the like, and s takes various values), and there are present many kinds (types) of crystal structures having different pore shapes. Zeolite has an inherent adsorption ability, catalyst performance, solid acid characteristics, ion exchange ability and the like based on the respective chemical compositions or crystal structures, and is utilized in various use applications such as an adsorbing material, a catalyst, a catalyst carrier, a gas separation film, and an ion exchanger.

For example, MFI-type zeolite (also referred to as "ZSM-5 type zeolite") is zeolite provided with pores each having a size of about 0.5 nm by oxygen ten-membered rings among crystals, and is utilized in a use application such as an adsorbing material which adsorbs nitrogen oxides ($NO_x$), hydrocarbons (HC) or the like from a car exhaust gas, or a gas separation film which selectively separates only p-xylene from a xylene isomer. Moreover, Deca-Dodecasil 3R (DDR) type zeolite is zeolite provided with pores of about 0.44×0.36 nm by oxygen eight-membered rings among crystals, and is utilized in a use application such as a gas separation film which selectively separates/removes only carbon dioxides from a natural gas or a biological gas to improve purity of methane which is useful as a fuel.

For example, there is suggested a selective reduction type catalyst including a catalyst which removes nitrogen oxides contained in an exhaust gas discharged from an engine for a car, an engine for a construction machine, an industrial stational engine, a burning apparatus or the like. Specifically, on the surface of an integral structure type carrier (C), there are disposed a lower catalyst layer (A) having a function of oxidizing nitrogen monoxides (NO) in the exhaust gas, and an upper catalyst layer (B) having a function of adsorbing ammonia. The lower catalyst layer (A) contains a noble metal, and the upper catalyst layer (B) includes zeolite (e.g., see Patent Document 1).

Moreover, there is suggested a catalyst including zeolite particles onto which 0.01 to 0.2 wt % of a noble metal is loaded and zeolite particles onto which 3 to 15 wt % of copper is loaded as main constituent particles, and particle diameters of both types of the particles are in a range of 1 to 20 μm (e.g., Patent Document 2).

In selective catalytic reduction (hereinafter abbreviated as "SCR" sometimes), for example, ammonia ($NH_3$) is used as a reducer which decomposes $NO_x$, and in the presence of ammonia, $NO_x$ is decomposed by a catalyst containing titanium oxide, vanadium oxide, zeolite and the like as main components. In such selective catalytic reduction, $NO_x$ is finally reduced to $N_2$ by reaction formulas (1) to (3) as follows.

Reducing reaction of the above reaction formula (1) proceeds at a temperature of about 200° C. or lower, but reducing reaction of the above reaction formula (2) proceeds at a temperature of 200° C. or higher, and reducing reaction of the above reaction formula (3) proceeds at a temperature of 275° C. or higher. Therefore, for the purpose of improving purification performance, it is important to perform the reducing reaction of the above reduction formula (1) in which the reaction proceeds at the low temperature. In an exhaust gas discharged from a diesel engine in a typical operation state thereof, a ratio of $NO_2$ in $NO_x$ is 0.5 or less. When the reducing reaction of the above reaction formula (1) is allowed to proceed, the amount of $NO_2$ becomes inadequate.

For example, in the selective reduction type catalyst disclosed in Patent Document 1 described above, ammonia is adsorbed by zeolite of the upper catalyst layer (B), and utilized as the catalyst of the above reaction formula (1). Moreover, an excessive amount of NO is oxidized in the lower catalyst layer (A) to generate $NO_2$, thereby allowing the reducing reaction of the above reaction formula (1) to proceed in the upper catalyst layer (B) again. Furthermore, when the amount of ammonia is excessively large, an excessive amount of ammonia is oxidized by the lower catalyst layer (A), whereby non-reacted ammonia can be prevented from being discharged to the environment.

Moreover, Patent Document 1 discloses a honeycomb structure in which the selective reduction type catalyst is not loaded onto the integral structure type carrier (e.g., a ceramic carrier made of cordierite or the like), but the honeycomb structure is constituted of a columnar honeycomb unit including inorganic particles containing an $NO_x$ adsorbing material and an ammonia adsorbing material and an inorganic binder, and including a plurality of cells partitioned by cell walls. The cell walls are coated with a zeolite containing material (e.g., see Patent Document 3).

[Patent Document 1] JP-A-2008-279334
[Patent Document 2] Japanese Patent No. 3285206
[Patent Document 3] WO2009/118868

However, a selective reduction type catalyst disclosed in Patent Document 1 is a catalyst loaded onto and used in an integral structure type carrier made of cordierite or the like, and this integral structure type carrier does not contribute to an $NO_x$ gas purifying function. The presence of the carrier causes a problem that a pressure loss increases.

Moreover, in the catalyst disclosed in Patent Document 2, there are mixed zeolite particles onto which a noble metal is loaded and zeolite particles onto which copper is loaded, and the respective types of particles have the same degree of size, which causes a problem that owing to the presence of the zeolite particles including the noble metal loaded onto the surface of the catalyst, ammonia necessary for purification of the $NO_x$ gas is oxidized before ammonia exerts a function of a reducer.

Furthermore, in a honeycomb structure disclosed in Patent Document 3, after forming the honeycomb structure by use of inorganic particles containing a noble metal, the surfaces of the cell walls are coated with zeolite again, which causes a problem that manufacturing steps become remarkably complicated. Moreover, it is remarkably difficult to regulate a film thickness of a zeolite film which coats the surfaces of the partition walls. If the zeolite film is excessively thin, ammonia necessary for the purification of the $NO_x$ gas is excessively oxidized in the same manner as in the catalyst disclosed in Patent Document 2. On the other hand, if the zeolite film is excessively thick, the problem of the increase of the pressure loss occurs.

SUMMARY OF THE INVENTION

The present invention has been developed in view of the above problem, and an object thereof is to provide a zeolite honeycomb structure having a low pressure loss and an excellent $NO_x$ gas purification performance.

The present inventor has intensely performed investigation to solve the above problem of the conventional technology, and has eventually found that when a zeolite structure having a honeycomb shape is prepared through extrusion forming by use of zeolite particles onto which any noble metal is not loaded and noble metal loaded catalyst carriers including a loaded noble metal and having an average particle diameter which is ten or more times an average particle diameter of the zeolite particles, the above object can be achieved, to complete the present invention. Specifically, according to the present invention, a zeolite honeycomb structure is provided as follows.

According to a first aspect of the present invention, a zeolite honeycomb structure is provided, comprising: a fired article obtained by firing a formed article formed by extruding a zeolite raw material containing zeolite particles, noble metal loaded catalyst carriers containing a noble metal loaded onto catalyst carriers, and an inorganic binding material in a honeycomb shape including partition walls disposed to form a plurality of cells which become through channels of a fluid and extend from one end face to the other end face, wherein an average particle diameter of the noble metal loaded catalyst carriers is ten or more times an average particle diameter of the zeolite particles, the noble metal loaded catalyst carriers are contained in an amount corresponding to a volume ratio which is from 5 to 25 vol % with respect to 100 vol % of the zeolite particles, and the noble metal is loaded onto the noble metal loaded catalyst carriers in an amount corresponding to a mass ratio which is from 0.2 to 2.0 mass % with respect to 100 mass % of the zeolite particles.

According to a second aspect, the zeolite honeycomb structure according to the first aspect provided, wherein when the partition walls consist of 20% of a surface portion in a thickness direction of the partition walls as surface portions and 60% of intermediate portions in the thickness direction of the partition walls as intermediate portions, 70 vol % or more of the whole noble metal loaded catalyst carriers is disposed in the intermediate portions of the partition walls.

According to a third aspect, the zeolite honeycomb structure according to the first or second aspects is provided, wherein the noble metal loaded onto the noble metal loaded catalyst carriers includes at least one type of metal selected from the group consisting of platinum, palladium, and rhodium.

According to a fourth aspect, the zeolite honeycomb structure according to any one of the first to third aspects is provided, wherein the catalyst carriers constituting the noble metal loaded catalyst carriers contain at least one type selected from the group consisting of alumina, titania, silica, zirconia, tungsten oxide, transition metal oxide, rare earth oxide, composite oxide of these oxides, and zeolite.

According to a fifth aspect, the zeolite honeycomb structure according to any one of the first to fourth aspects is provided, wherein zeolite particles of at least a part of the zeolite particles are particles made of at least one type of zeolite selected from the group consisting of ZSM-5 type zeolite, β-type zeolite, Y-type zeolite, mordenite type zeolite, and ferrierite type zeolite.

According to a sixth aspect, zeolite honeycomb structure according to any one of the above first to fifth aspects is provided, wherein zeolite particles of at least a part of the zeolite particles are particles made of zeolite subjected to ion exchange between cations of zeolite and ions of at least one type of metal selected from the group consisting of copper, iron, nickel, zinc, manganese, cobalt, silver, indium, cerium, gallium, titanium, and vanadium.

According to a seventh aspect, the zeolite honeycomb structure according to any one of the first to sixth aspects is provided, wherein the inorganic binding material includes at least one type selected from the group consisting of silica sol, alumina sol, titania sol, zirconia sol, ceria sol, boehmite, montmorillonite, hydrotalcite, basic aluminum chloride, hydraulic alumina, silicon resin, and water glass.

According to an eighth aspect, a manufacturing method of a zeolite honeycomb structure is provided, comprising: a step of mixing zeolite particles, noble metal loaded catalyst carriers including a noble metal loaded onto catalyst carriers, an inorganic binding material, and an organic binder, to prepare a zeolite raw material; a step of extruding the obtained zeolite raw material in a honeycomb shape to obtain a formed zeolite honeycomb article; and a step of firing the obtained formed zeolite honeycomb article, to prepare the zeolite honeycomb structure, wherein an average particle diameter of the noble metal loaded catalyst carriers is ten or more times an average particle diameter of the zeolite particles, the noble metal loaded catalyst carriers are contained in an amount corresponding to a volume ratio which is from 5 to 25 vol % with respect to 100 vol % of the zeolite particles, and the noble metal is loaded onto the noble metal loaded catalyst carriers in an amount corresponding to a mass ratio which is from 0.2 to 2.0 mass % with respect to 100 mass % of the zeolite particles.

A zeolite honeycomb structure of the present invention is formed by extruding a raw material including predetermined amounts (predetermined volumes) of zeolite particles and noble metal loaded catalyst carriers, respectively. The noble metal loaded catalyst carriers have an average particle diameter which is ten or more times an average particle diameter of the zeolite particles, and a predetermined amount of a noble metal is loaded onto the noble metal loaded catalyst carriers. The zeolite honeycomb structure has a low pressure loss and an excellent $NO_x$ gas purification performance. In particular, since the zeolite honeycomb structure of the present invention is obtained by the extrusion forming, the above zeolite particles are arranged in a concentrated manner on a surface portion of partition walls disposed to form cells, and the above noble metal loaded catalyst carriers having a large average particle diameter are arranged inside the partition walls, whereby it is possible to effectively prevent ammonia necessary for purification of an $NO_x$ gas from being unnecessarily oxidized by the noble metal loaded catalyst carriers. Moreover, when a large amount of NO is included in the $NO_x$ gas, an excessive amount of NO can be oxidized into $NO_2$ by the noble metal loaded catalyst carriers, and a catalyst reaction, which advantageously proceeds at a comparatively low temperature, can efficiently proceed. Furthermore, a catalyst carrier having a honeycomb shape is not required, but the zeolite particles and the noble metal loaded catalyst carriers form a structure in which particles are bound to one another with the inorganic binding material. In consequence, as compared with a honeycomb structure using a conventional ceramic carrier, a pressure loss can be lowered.

Furthermore, when a formed article is obtained by extrusion forming and is further fired, it is possible to manufacture a zeolite honeycomb structure in which the zeolite particles and the noble metal loaded catalyst carriers are arranged at predetermined positions. In consequence, manufacturing steps are remarkably simple.

It is to be noted that a reason why the zeolite particles are arranged on the surface portions of the partition walls and the noble metal loaded catalyst carriers are arranged inside the partition walls is supposedly a viscosity of a forming fluid (i.e., a zeolite raw material) during the extrusion forming. That is, when the zeolite raw material is extruded in a honeycomb shape, the article is formed by using a forming die provided with slits having a width corresponding to a partition wall shape. However, in an outward portion in a slit width direction (i.e., wall side portions of the slits), the viscosity of the fluid becomes large owing to contact between the die and the raw material. Therefore, zeolite particles having a small resistance during the extrusion forming (i.e., particles having a small average particle diameter) concentrate on the outward portion in the slit width direction, and the noble metal loaded catalyst carriers having a large resistance during the extrusion forming (i.e., particles having a large average particle diameter) concentrate on inward portions in the slits width direction (i.e., an intermediate portion in a slit width direction).

In consequence, since the zeolite honeycomb structure of the present invention is a structure constituted of the formed article obtained by the extrusion forming, whereby the surface portions of the partition walls disposed to form the cells is constituted of the zeolite particles, and the noble metal loaded catalyst carrier is disposed inside the partition walls to cover the carrier with the zeolite particles. In consequence, when the zeolite honeycomb structure is used as a selective reduction type catalyst including ammonia ($NH_3$) as a reducer, an excessive amount of ammonia, which cannot completely be adsorbed by the zeolite particles in the surface portions of the partition walls, can be oxidized by the noble metal loaded catalyst carriers inside the partition walls. Moreover, in an $NO_x$ reducing reaction which proceeds at a lower temperature as in the above reaction formula (1), when the amount of $NO_2$ is inadequate, an excessive amount of NO is oxidized into $NO_2$ by the noble metal loaded catalyst carriers inside the partition walls, whereby the reducing reaction of $NO_x$ can satisfactorily proceed in the surface portions of the partition wall again.

DETAILED DESCRIPTION OF THE INVENTION

Next, a configuration for carrying out the present invention will be described in detail with reference to the drawings, but it should be understood that the present invention is not limited to the following embodiment, and design modification, improvement and the like are appropriately added based on knowledge of a person with ordinary skill in the art without departing from the scope of the present invention.

Figure 1:
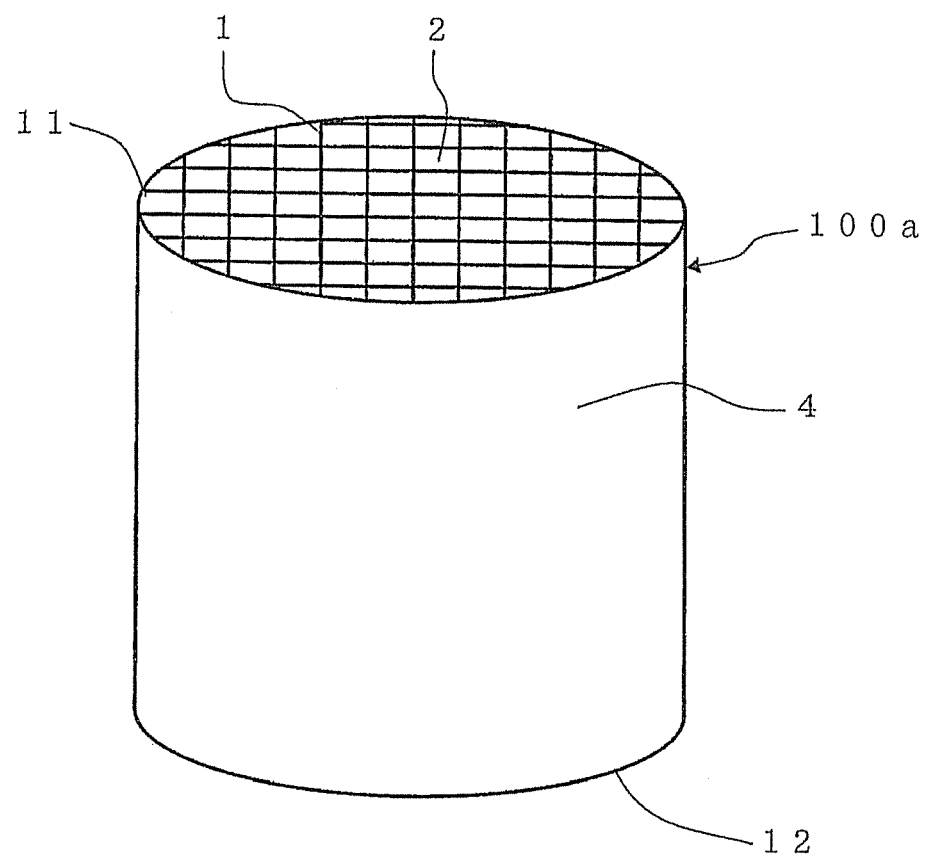
FIG. 1 is a perspective view schematically showing one embodiment of a zeolite honeycomb structure of the present invention.
Figure 2:
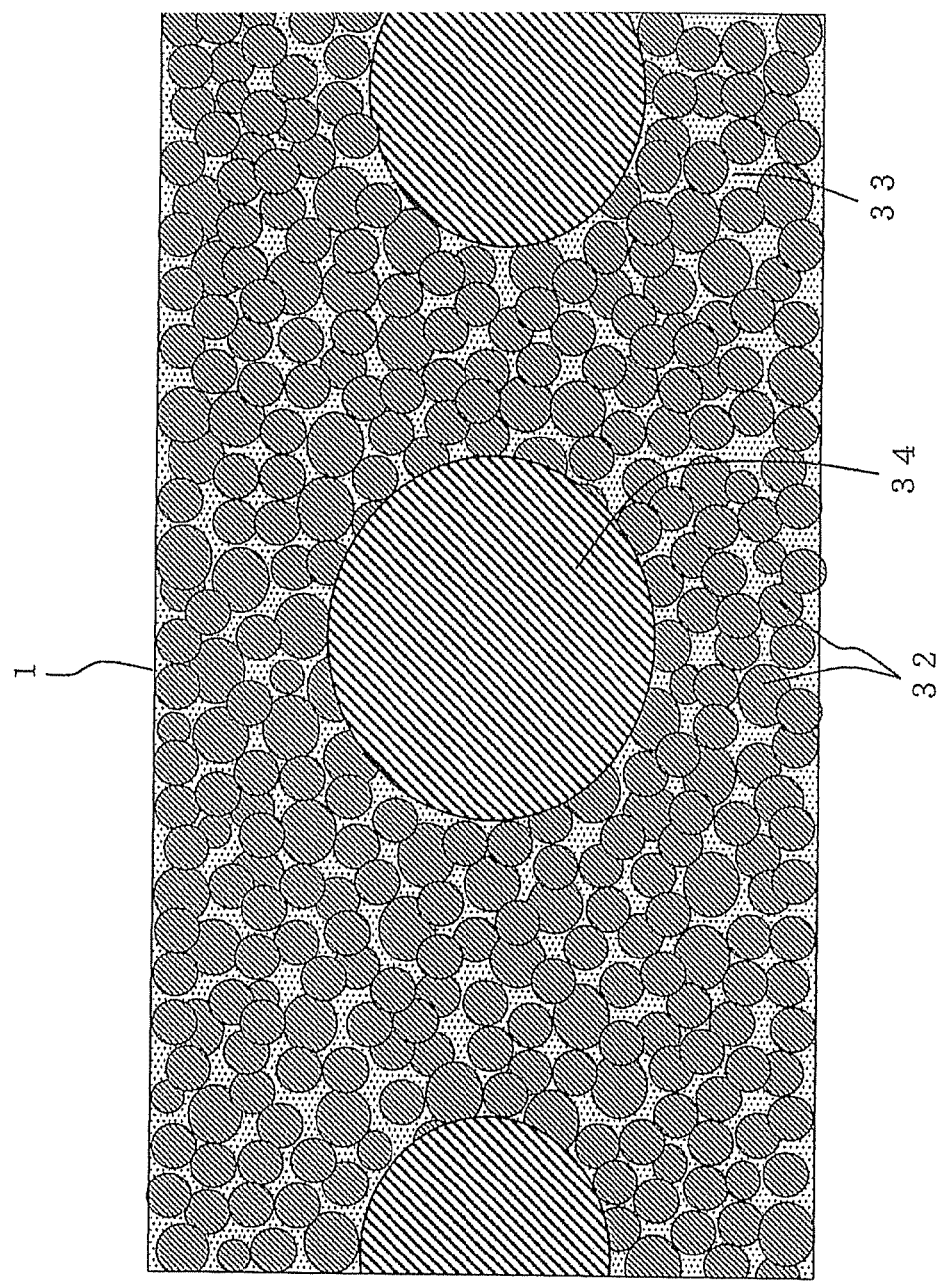
FIG. 2 is an enlarged sectional view schematically showing a section of a partition wall of the zeolite honeycomb structure of FIG. 1 cut along a direction which is perpendicular to a cell extending direction.

(1) Zeolite Honeycomb Structure:

As shown in FIG. 1 and FIG. 2, an embodiment of a zeolite honeycomb structure of the present invention is a zeolite honeycomb structure 100 constituted of a fired article 100a obtained by firing a formed article formed by extruding a zeolite raw material containing zeolite particles 32, noble metal loaded catalyst carriers 34 containing a noble metal loaded onto the catalyst carriers, and an inorganic binding material 33 in a honeycomb shape including partition walls 1 disposed to form a plurality of cells 2 which become through channels of a fluid and extend from one end face 11 to the other end face 12. Moreover, in the zeolite honeycomb structure 100 of the present embodiment, the average particle diameter of the noble metal loaded catalyst carriers is ten or more times an average particle diameter of the zeolite particles 32.

Here, FIG. 1 is a perspective view schematically showing the embodiment of the zeolite honeycomb structure of the present invention, and FIG. 2 is an enlarged sectional view schematically showing a section of a partition wall of the zeolite honeycomb structure of FIG. 1 cut along a direction which is perpendicular to a cell extending direction.

The zeolite honeycomb structure 100 of the present embodiment includes, as aggregates, the zeolite particles 32 and the noble metal loaded catalyst carriers 34 having an average particle diameter which is ten or more times an average particle diameter of the zeolite particles 32 and containing the loaded noble metal. Furthermore, the structure is extrusion-formed by using the zeolite raw material further containing the inorganic binding material which binds the aggregates to one another (i.e., the fired article 100a obtained by drying and firing the obtained formed article), and the structure has a low pressure loss and an excellent $NO_x$ gas purification performance.

Furthermore, the zeolite honeycomb structure 100 of the present embodiment, the noble metal loaded catalyst carriers are contained in an amount which is from 5 to 25 vol % with respect to 100 vol % of the zeolite particles, and the noble metal is loaded onto the noble metal loaded catalyst carriers in an amount which is from 0.2 to 2.0 mass % with respect to 100 mass % of the zeolite particles. According to such a constitution, $NO_x$ in an exhaust gas can satisfactorily be removed.

In particular, since the zeolite honeycomb structure 100 of the present embodiment is obtained by the extrusion forming, the zeolite particles 32 are arranged in a concentrated manner on a surface portion of the partition walls 1 disposed to form the cells, and the noble metal loaded catalyst carriers 34 having a large average particle diameter are arranged inside the partition walls 1, whereby it is possible to effectively prevent ammonia necessary for purification of an $NO_x$ gas from being unnecessarily oxidized by the noble metal loaded catalyst carriers 34. Moreover, when $NO_x$ includes a large amount of NO, an excessive amount of NO can be oxidized into $NO_2$ by the noble metal loaded catalyst carriers 34. Whereby a catalyst reaction which advantageously proceeds at a comparatively low temperature (e.g., 200° C. or lower) (i.e., the catalyst reaction of the above formula (1)) can be allowed to efficiently proceed. Furthermore, a catalyst carrier having a honeycomb shape is not required, but the zeolite honeycomb structure 100 is the structure in which the zeolite particles 32 and the noble metal loaded catalyst carriers 34 are bound to one another with the inorganic binding material 33, whereby as compared with the honeycomb structure including a conventional ceramic carrier, the pressure loss can be lowered.

Furthermore, when a formed article is obtained by extrusion forming and further fired, it is possible to manufacture the zeolite honeycomb structure 100 in which the zeolite particles 32 and the noble metal loaded catalyst carriers 34 are arranged at predetermined positions. In consequence, manufacturing steps are remarkably simple.

It is to be noted that a reason why the zeolite particles 32 are arranged in the surface portions of the partition walls 1 and the noble metal loaded catalyst carriers 34 are arranged inside the partition walls 1 is supposedly a viscosity of a forming fluid (i.e., a zeolite raw material) during the extrusion forming. That is, when the zeolite raw material is extruded in a honeycomb shape, the article is formed by using a forming die provided with slits having a width corresponding to a shape of the partition walls 1. However, in an outward portion in a slit width direction (i.e., wall side portions of the slits), the viscosity of the fluid becomes large owing to contact between the die and the raw material. Therefore, the zeolite particles 32 having a small resistance during the extrusion forming (i.e., particles having a small average particle diameter) concentrate on the outward portion in a slit width direction, and the noble metal loaded catalyst carriers 34 having a large resistance during the extrusion forming (i.e., particles having a large average particle diameter) concentrate on inward portions in a silt width direction (i.e., an intermediate portion in the slit width direction).

In consequence, since the zeolite honeycomb structure 100 of the present embodiment is a structure constituted of the formed article obtained by the extrusion forming, the partition walls 1 disposed to form the cells 2 in the surface portions thereof are constituted of the zeolite particles 32, and the noble metal loaded catalyst carriers 34 are arranged inside the partition walls 1 so as to be covered by the zeolite particles 32. Therefore, when the structure is used as a selective reduction type catalyst containing ammonia ($NH_3$) as a reducer, an excessive amount of ammonia, which cannot completely be adsorbed by the zeolite particles 32 in the surface portions of the partition walls 1, can be oxidized by the noble metal loaded catalyst carriers 34 inside the partition walls 1. Moreover, when the amount of $NO_2$ becomes inadequate in the $NO_x$ reducing reaction which proceeds at a lower temperature as in the above reaction formula (1), an excessive amount of NO is oxidized into $NO_2$ inside the partition walls 1 (i.e., the noble metal loaded catalyst carriers 34 oxidize NO to generate $NO_2$), whereby the $NO_x$ reducing reaction can satisfactorily proceed in the surface portions of the partition walls 1 again.

(1-1) Zeolite Particles:

The zeolite particles are one type of the aggregates constituting the partition walls of the zeolite honeycomb structure of the present embodiment. As shown in FIG. 2, the zeolite particles 32 are arranged so that more particles are distributed in the surface portions of the partition walls 1. That is, the partition walls have a constitution in which the noble metal loaded catalyst carriers 34 are coated with the zeolite particles 32. The zeolite particles 32 have a function of the selective reduction type catalyst including ammonia as the reducer, and also have a function of an adsorbing material which adsorbs the reducer.

That is, in the reducing reaction in which ammonia is used as the reducer, when a molar ratio between ammonia and $NO_x$ is 1:1, the purification performance becomes highest. However, the amount of $NO_x$ in the exhaust gas is not constant. Therefore, it is remarkably difficult to control the molar ratio between ammonia and $NO_x$ at 1:1 and maintain a high state of the purification performance. In the zeolite honeycomb structure of the present embodiment, when the amount of ammonia is excessively large with respect to the amount of $NO_x$, the zeolite particles arranged in the surface portions of the partition walls 1 can adsorb at least a part of the excessive amount of ammonia. Moreover, the molar ratio between ammonia and $NO_x$ is controlled so that the ratio constantly comes close to 1:1, and the high state of the purification performance can be maintained.

As the zeolite particles, particles made of heretofore known zeolite can be used. There is not any special restriction on the type of the zeolite particles or the like, but there are preferably used particles made of at least one type of zeolite selected from the group consisting of ZSM-5 type zeolite, β-type zeolite, Y-type zeolite, mordenite type zeolite, and ferrierite type zeolite. Among these types of zeolite, particles made of ZSM-5 type zeolite and β-type zeolite are preferably used, because such type of zeolite has satisfactory purification performance and adsorption performance. Among the above types of zeolite, the zeolite particles may be particles made of one type of zeolite or a mixture of particles made of a plurality of types of zeolite.

There is not any special restriction on the size of the zeolite particles, but the average particle diameter of the particles is, for example, preferably from 0.1 to 30 µm, further preferably from 0.5 to 10 µm and especially preferably from 0.7 to 5 µm. If the average particle diameter of the zeolite particles is smaller than 0.1 µm, heat resistance of the zeolite honeycomb structure lowers sometimes. If the average particle diameter exceeds 30 µm, the noble metal loaded catalyst carriers having an average particle diameter which is ten times an average particle diameter of the zeolite particles become excessively large, and it may become difficult to extrude the zeolite raw material.

It is to be noted that the average particle diameter of the zeolite particles can be obtained by measuring particle diameters from an SEM photograph which is used for calculation of a volume ratio of the inorganic binding material described later by use of image analysis software (e.g., "Image-Pro Plus (trade name)" manufactured by MEDIA CYBERNETICS, Co.), and obtaining a particle size distribution of the zeolite particles. It is to be noted that during the measurement of the particle diameters by the above image analysis software, when the particles are round, the diameters of the particles can be measured as the particle diameters. Moreover, when the particle diameters of the zeolite particles are measured, an average value of the diameters in at least ten fields of view (i.e. corresponding to ten SEM photographs) is obtained. Moreover, the average particle diameter of the noble metal loaded catalyst carriers can be obtained from the above SEM photographs in the same manner as in the average particle diameter of the zeolite particles.

Moreover, when the average particle diameters of the zeolite particles and noble metal loaded catalyst carriers which are used in a raw material stage (i.e., a manufacturing stage) can be measured, the average particle diameters of the respective particles can be measured in this raw material stage. When the average particle diameter of the zeolite particles is obtained by such a method, the average particle diameter can remarkably easily be obtained. "The average particle diameter" in the present embodiment is a median diameter (d50) in the particle diameter distribution. It is to be noted that the average particle diameter of the zeolite particles is a value measured by a laser diffraction scattering process in conformity to JIS R1629. On the other hand, the average particle diameter of the noble metal loaded catalyst carriers is a value measured by a flow type particle image analysis process (also referred to as the flow type image analysis process). The average particle diameter of the zeolite particles can be measured with, for example, a laser diffraction/scattering type particle size distribution measuring device: "LA-920 (trade name)" manufactured by Horiba, Ltd., and the average particle diameter of the noble metal loaded catalyst carriers can be measured with a flow type particle image analysis device manufactured by SYSMEX Corporation.

Furthermore, the zeolite particles are preferably particles onto which any noble metal is not loaded. That is, the zeolite honeycomb structure of the present embodiment can effectively be used, for example, as a selective reduction type catalyst including ammonia ($NH_3$) as the reducer. Specifically, a partition wall portion constituted of the zeolite particles has a function of the selective reduction type catalyst which adsorbs ammonia to be used as the reducer, and a function of a catalyst which reduces $NO_x$ (specifically, NO and $NO_2$) by ammonia. In this case, when the noble metal is loaded onto the zeolite particles, ammonia which becomes the reducer may be oxidized by the catalyst. When the noble metal does not have any ammonia oxidizing function or has a remarkably low oxidizing function, the noble metal may be loaded onto the zeolite particles.

In addition, the zeolite particles may be zeolite particles subjected to ion exchange between cations of zeolite and metal ions. Such zeolite particles subjected to the ion exchange between cations of zeolite and the metal ions have an excellent catalyst function, and can more satisfactorily perform, for example, a treatment of $NO_x$ in the exhaust gas.

Specifically, zeolite particles of at least a part of the zeolite particles may be particles made of zeolite subjected to the ion exchange between cations of zeolite and the ions of at least one type of metal selected from the group consisting of copper, iron, nickel, zinc, manganese, cobalt, silver, indium, cerium, gallium, titanium and vanadium. For example, the ion exchange between cations of zeolite and iron ions or copper ions can develop a satisfactory $NO_x$ gas purification performance, or the ion exchange between cations of zeolite and copper ions or silver ions can develop a satisfactory hydrocarbon adsorption ability.

It is to be noted that there is not any special restriction on an ion exchange amount between cations of zeolite and the metal ions, but the ion exchange amount ($M^+$/Al ion molar ratio) is preferably from 0.3 to 2.0, further preferably from 0.7 to 1.5 and especially preferably from 0.9 to 1.2. It is to be noted that the ion exchange amount can be measured with, for example, an inductively coupled plasma mass analysis device: "SPQ9000 (trade name)" manufactured by Seiko Instruments, Inc. It is to be noted that the above ion exchange amount is a molar ratio ("$M^+$/Al ions") of a valence ($M^+$) of the metal ions with respect to aluminum ions (Al ions) in zeolite. If the ion exchange amount is small (e.g., smaller than 0.3), a catalyst performance lowers. On the other hand, if the ion exchange amount is excessively large (e.g., exceeding 2.0), the catalyst performance is saturated, and an effect by the ion exchange is not easily produced. Moreover, the ion exchange amount can be represented by a ratio (mass %) of a mass of the metal ions with respect to a mass of the zeolite particles subjected to the exchange.

(1-2) Noble Metal Loaded Catalyst Carriers:

The noble metal loaded catalyst carriers contain a noble metal loaded onto catalyst carriers. For example, when these noble metal loaded catalyst carriers are disposed inside the partition walls and an exhaust gas discharged from a diesel engine or the like and having an $NO_2$ ratio of 0.5 or less in $NO_x$ is purified (i.e., when the exhaust gas having a large NO ratio with respect to $NO_2$ is purified), an excessive amount of NO which cannot completely be purified in the reducing reaction in the surface portions of the partition walls is oxidized into $NO_2$ inside the partition walls. When the $NO_2$ which is oxidized passes through the surface portions of the partition walls again, the $NO_2$ can be reduced to $N_2$. Therefore, even when the exhaust gas discharged from the diesel engine has a small ratio of $NO_2$, it is possible to advantageously proceed with the reducing reaction by the above reaction formula (1), which proceeds in a case where the molar ratio between NO and $NO_2$ is 1:1. Moreover, it is possible to satisfactorily remove $NO_x$ at a comparatively low temperature of 200° C. or lower.

Moreover, when the amount of ammonia as the reducer is excessively large and the excessive amount of ammonia passes through inside the partition walls, at least a part of the excessive amount of ammonia can be subjected to an oxidization treatment by the noble metal loaded catalyst carriers, and non-reacted ammonia can effectively be prevented from being discharged to the environment. Furthermore, when non-reacted ammonia is oxidized inside the partition walls and the $NO_x$ gas generated by the oxidation of ammonia passes through the surface portions of the partition walls again, the gas can be purified by ammonia adsorbed by the zeolite particles.

The average particle diameter of the noble metal loaded catalyst carriers is ten or more times the average particle diameter of the zeolite particles. Since the particles have such a size, during the extrusion forming, the noble metal loaded catalyst carriers are arranged in a concentrated manner inside the partition walls. That is, if the average particle diameter of the noble metal loaded catalyst carriers is smaller than ten times the average particle diameter of the zeolite particles, a difference between the particle diameters of the zeolite particles and the noble metal loaded catalyst carriers becomes small. During the extrusion forming, the noble metal loaded catalyst carriers and the zeolite particles are arranged in a disordered state, and the noble metal loaded catalyst carriers are also arranged in the surface portion of the partition walls. In the surface portion of the partition walls, ammonia, which is to be used as the reducer, is oxidized, and the $NO_x$ gas purification performance remarkably lowers.

It is to be noted that the average particle diameter of the noble metal loaded catalyst carriers is preferably from 10 to 1000 times, further preferably from 20 to 100 times, and especially preferably from 40 to 80 times the average particle diameter of the zeolite particles. For example, if the average particle diameter of the noble metal loaded catalyst carriers exceeds 1000 times the average particle diameter of the zeolite particles, the noble metal loaded catalyst carriers become excessively large, and it may become difficult to perform the extrusion forming. It is to be noted that the average particle diameter of the noble metal loaded catalyst carriers is specifically preferably from 5 to 300 μm, further preferably from 10 to 100 μm, and especially preferably from 30 to 60 μm.

It is to be noted that if the amount of the noble metal loaded catalyst carriers is excessively large, the amount of the zeolite particles to be subjected to an $NO_x$ reducing reaction relatively decreases, the purification performance lowers sometimes, and ammonia is oxidized more than necessary. On the other hand, if the amount of the noble metal loaded catalyst carriers is excessively small and the excessive amount of NO is included in the exhaust gas, the oxidation of NO cannot sufficiently be performed, or non-reacted ammonia cannot be subjected to an oxidation treatment. The noble metal loaded catalyst carriers need to be contained in an amount which is from 5 to 25 vol %, preferably from 5 to 20 vol % and especially preferably from 10 to 15 vol % with respect to 100 vol % of the zeolite particles. When the noble metal loaded catalyst carriers are contained in a volume which is from 5 to 25 vol % with respect to 100 vol % of the zeolite particles, it is possible to suppress the above lowering of the purification performance and the excessive oxidation of ammonia. It is to be noted that the volume of the zeolite particles and the volume of the noble metal loaded catalyst carriers can be obtained by equations (5) and (6) described later.

The catalyst carriers constituting the noble metal loaded catalyst carriers contain at least one type selected from the group consisting of alumina, titania, silica, zirconia, tungsten oxide, transition metal oxide, rare earth oxide, composite oxide of these oxides, and zeolite in a preferable example.

Such a catalyst carrier is preferably constituted of a porous material. For example, a specific surface area of the catalyst carrier is preferably from 10 to 1000 $m^2/g$, further preferably from 30 to 600 m²/g, and especially preferably from 100 to 600 m²/g. For example, the porous material having an average particle diameter of 5 μm or more and a specific surface area in the above numeric value range can satisfactorily be used as the catalyst carrier onto which the noble metal is loaded.

Here, the specific surface area is the surface area per unit mass indicating a value (BET specific surface area) acquired by obtaining a molecule number (N) necessary for covering the surface of a sample with a monomolecular layer of a gas adsorbed in the surface of the sample, for example, by gas physical adsorption with B.E.T principle, multiplying this adsorption molecular number (N) by a molecule sectional area of the adsorbed gas to obtain the surface area of the sample, and dividing the surface area of this sample by the mass of the sample. The specific surface area can be measured by a flow type specific surface area measuring device: "Flow-Sorb-2300 (trade name)" manufactured by Micromeritics, Inc. It is to be noted that when the specific surface area is measured, as a sample pretreatment, the sample is held at 200° C. for ten minutes.

Moreover, there is not any special restriction on the shape of the catalyst carriers, but the shape is preferably a spherical shape or an elliptic sphere shape (e.g., an egg shape, a lemon shape or a rugby ball shape). In particular, the catalyst carriers more preferably have a spherical shape so that during the extrusion forming, the noble metal loaded catalyst carriers positively move to intermediate portions of the partition walls, and it is possible to form the partition walls in a state in which the noble metal loaded catalyst carriers are covered with the zeolite particles.

Furthermore, the noble metal loaded onto the catalyst carrier preferably includes at least one type of metal selected from the group consisting of platinum, palladium, and rhodium. When such a noble metal is included, the excessive amount of NO and ammonia can satisfactorily be oxidized.

The amount of the noble metal to be loaded needs to correspond to a mass ratio which is from 0.2 to 2.0 mass %, preferably from 0.5 to 1.5 mass %, and especially preferably from 0.5 to 1.0 mass % with respect to 100 mass % of the zeolite particles. It is to be noted that if the mass ratio is smaller than 0.2 mass %, the catalyst performance of the noble metal loaded catalyst carriers lowers, and the purification performance cannot improve. On the other hand, if the mass ratio exceeds 2.0 mass %, the catalyst performance is saturated, and a sufficient effect cannot easily be produced. Moreover, the excessive amount of a valuable noble metal is used, which unfavorably raises a cost problem.

Examples of a method of preparing the noble metal loaded catalyst carriers include a method of first adding, to the catalyst carriers of alumina sol, a predetermined amount of a platinum chloride aqueous solution containing platinum together with catalyst components such as zeolite or ceria sol, to mix this material; and further mixing the material by a ball mill or the like while adding water to regulate a viscosity of the material, thereby preparing a slurry of the noble metal loaded catalyst carriers. Afterward, this slurry is dried at a temperature which is from 120 to 200° C. by using, for example, a spray drier to obtain granulated powder, which is then fired at 500 to 700° C. in a firing further for one to ten hours. Next, the obtained fired substance (the fired article) is classified by using a sieve, whereby the noble metal loaded catalyst carriers having a predetermined average particle diameter can be obtained. It is to be noted that a method of preparing the noble metal loaded catalyst carriers is not limited to the above methods. For example, after first preparing the catalyst carriers having a predetermined average particle diameter, a catalyst containing at least the noble metal may be loaded onto the catalyst carriers by a heretofore known catalyst loading method.

(1-3) Inorganic Binding Material:

The inorganic binding material is a binding material which binds the zeolite particles and the noble metal loaded catalyst carriers to one another as described above.

As such an inorganic binding material, for example, it is possible to preferably use an inorganic binding material containing at least one type selected from the group consisting of silica sol, alumina sol, titania sol, zirconia sol, ceria sol, boehmite, montmorillonite, hydrotalcite, basic aluminum chloride, hydraulic alumina, silicon resin, and water glass.

Moreover, the volume ratio of the inorganic binding material with respect to the whole zeolite material, i.e., the whole zeolite honeycomb structure is preferably from 10 to 50 vol %, further preferably from 10 to 30 vol %, and especially preferably from 15 to 25 vol %. If the volume ratio of the inorganic binding material is smaller than 10 vol %, it may become difficult to satisfactorily bind the zeolite particles and the noble metal loaded catalyst carriers. On the other hand, if the volume ratio of the inorganic binding material exceeds 50 vol %, the purification performance deteriorates sometimes.

It is to be noted that the volume (the true volume) "V" of the zeolite honeycomb structure is a value obtained by equation (4) as follows.

$$V = V_Z + V_P + V_{B2} \quad (4),$$

V: the volume (the true volume) of the zeolite structure;
$V_Z$: the volume of the zeolite particles;
$V_P$: the volume of the noble metal loaded catalyst carriers; and
$V_{B2}$: the volume of the (fired) inorganic binding material.

The volume $V_Z$ of the zeolite particles, the volume $V_P$ of the noble metal loaded catalyst carriers and the volume $V_{B2}$ of the (fired) inorganic binding material can be calculated from a fine structure photograph of a section of the zeolite honeycomb structure cut along a predetermined place. More specifically, in a calculation method of the above volume, for example, the zeolite honeycomb structure is first cut, and a cut section of the structure is polished. Next, the cut and polished section is photographed with a scanning type electron microscope or the like. It is to be noted that when the fine structure of the section is photographed, a field of view preferably includes 10 to 30 zeolite particles.

In the obtained scanning type electron microscope photograph (hereinafter referred to as "the SEM photograph" sometimes), the zeolite particles, the noble metal loaded catalyst carriers and the inorganic binding material are classified by using image analysis software (e.g., "Image-Pro Plus (trade name)" manufactured by MEDIA CYBERNETICS, Co.) to measure particle diameters or an occupied area of the zeolite particles, particle diameters or an occupied area of the noble metal loaded catalyst carriers and an occupied area of the inorganic binding material. When these values are measured, an average value in at least ten fields of view (i.e., corresponding to ten SEM photographs) is obtained.

Furthermore, the volume $V_Z$ of the zeolite particles, the volume $V_P$ of the noble metal loaded catalyst carriers and the volume $V_{B2}$ of the (fired) inorganic binding material are calculated from the measured values. Therefore, in the present description, "the volume of the zeolite particles" means the total value of the volumes of the zeolite particles, i.e., the volume which does not include any gap (pore) among the zeolite particles.

In addition, when the masses of the zeolite particles, the noble metal loaded catalyst carriers and the inorganic binding material which are used in a raw material stage (i.e., a manufacturing stage) are beforehand known, or when the volume of each raw material component can be measured in the manufacturing stage, the volume ratio of the inorganic binding material may be calculated in the raw material stage. When the volume ratio of the inorganic binding material is obtained by such a method, the volume ratio of the inorganic binding material can remarkably easily be obtained. Hereinafter, a method of calculating the volume ratio of the inorganic binding material in the raw material stage will be described.

"$V_Z$: the volume of the zeolite particles" in the above equation (4) can be obtained by equation (5) as follows.

$$V_Z = M_Z/D_Z \quad (5),$$

$V_Z$: the volume of the zeolite particles;
$M_Z$: the mass of the zeolite particles; and
$D_Z$: the density of zeolite (1.85 g/cm³).

Moreover, "$V_P$: the volume of the noble metal loaded catalyst carriers" in the above equation (4) can be obtained by equation (6) as follows.

$$V_P = M_{BP}/D_{BP} \quad (6),$$

$V_P$: the volume of the noble metal loaded catalyst carriers;
$M_{BP}$: the mass of the fired noble metal loaded catalyst carriers; and
$D_{BP}$: the density of the fired noble metal loaded catalyst carriers.

It is to be noted that the mass ($M_{BP}$) and density ($D_{BP}$) of the noble metal loaded catalyst carriers in the above equation (6) are values obtained after firing the article and after loading the noble metal. Furthermore, the values are measured before mixing the noble metal loaded catalyst carriers with the zeolite particles and the inorganic binding material (i.e., the values are measured before preparing the zeolite raw material). The density ($D_{BP}$) of the fired noble metal loaded catalyst carriers can be measured with a dry type automatic densimeter "Accupyc 1330 (trade name)" manufactured by Micromeritics, Inc.

It is to be noted that when zeolite is included in the catalyst carriers of the noble metal loaded catalyst carriers, the densities of the fired catalyst carriers other than zeolite and the noble metal are measured. Afterward, the density of the noble metal loaded catalyst carriers can be obtained by equation (6-1) as follows.

$$D_{BP} = C_{BP3} \times D_{BP3} + C_{BPZ} \times D_Z \quad (6-1),$$

$C_{BP3}$: the total mass ratio (%) of the catalyst carriers other than zeolite, and the noble metal in the fired noble metal loaded catalyst carriers;
$C_{BPZ}$: the mass ratio (%) of zeolite in the fired noble metal loaded catalyst carriers;
$D_{BP3}$: the density of the catalyst carriers other than zeolite and the noble metal after fired; and
$D_Z$: the density of zeolite (1.85 g/cm³).

"$C_{BP3}$: the total mass ratio (%) of the catalyst carriers other than zeolite and the noble metal in the fired noble metal loaded catalyst carriers" and "$C_{BPZ}$: the mass ratio (%) of zeolite in the fired noble metal loaded catalyst carriers" in the above equation (6-1) are values obtained by equations (6-2) and (6-3) as follows.

$$C_{BP3} = M_{B3}/(M_{B3} + M_{BZ}) \quad (6-2), \text{ and}$$

$$C_{BPZ} = 1 - C_{BP3} \quad (6-3),$$

$M_{B3}$: the total mass of the catalyst carriers other than zeolite and the noble metal in the fired noble metal loaded catalyst carriers; and $M_{BZ}$: the mass of zeolite in the fired noble metal loaded catalyst carriers.

Moreover, "$V_{B2}$: the volume of the (fired) inorganic binding material" in the above equation (4) can be obtained by equation (7) as follows. It is to be noted that "$M_{B2}$: the mass of the fired inorganic binding material" in the equation (7) is a value obtained by equation (8) as follows, and "$D_{B2}$: the density of the (fired) inorganic binding material" in the equation (7) and "$m_B$: a mass change ratio of the inorganic binding material before/after fired" in the equation (8) are value beforehand obtained through firing only by use of the inorganic binding material.

$$V_{B2} = M_{B2}/D_{B2} \quad (7),$$

$V_{B2}$: the volume of the fired inorganic binding material;
$M_{B2}$: the mass of the fired inorganic binding material; and
$D_{B2}$: the density of the fired inorganic binding material.

$$M_{B2} = M_{B1} \times m_B \quad (8),$$

$M_{B2}$: the mass of the fired inorganic binding material;
$M_{B1}$: the mass of the inorganic binding material before fired; and
$m_B$: the mass change ratio of the inorganic binding material before/after fired.

(1-4) Constitution of Zeolite Honeycomb Structure:

As shown in FIG. 1, the zeolite honeycomb structure 100 of the present embodiment includes the partition walls 1 disposed to form a plurality of cells 2 which become through channels of a fluid and extend from one end face 11 to the other end face 12.

As shown in FIG. 2, the partition walls 1 are constituted of the zeolite particles 32, the noble metal loaded catalyst carriers 34 including the noble metal loaded onto the catalyst carriers, and the inorganic binding material 33. The zeolite particles 32 are arranged in a concentrated manner in a surface portion of the partition walls 1, and the noble metal loaded catalyst carriers 34 are arranged in a concentrated manner inside the partition walls 1. It is to be noted that the zeolite particles 32 are particles having a small average particle diameter as compared with the noble metal loaded catalyst carriers 34, and hence the zeolite particles are arranged inside the partition walls 1 so as to fill in gaps of the noble metal loaded catalyst carriers 34 arranged inside the partition walls 1. In the zeolite particles 32 and the noble metal loaded catalyst carriers 34 arranged in such a state, the particles are bound to one another with the inorganic binding material 33, thereby forming one structure (a porous structure). It is to be noted that in FIG. 2, pores formed in the porous structure are not shown.

It is to be noted that portions of the partition walls having a length of 20% from the surfaces of the partition walls in a thickness direction thereof are surface portions of the partition walls, and portions of the partition walls having a length which is from 20 to 80% from the surfaces of the partition walls (a length of 60% of an intermediate part) are intermediate portions of the partition walls, respectively. In this case, 70 vol % or more (i.e., from 70 to 100 vol %) of the noble metal loaded catalyst carriers with respect to the whole volume of the carriers are preferably arranged in the intermediate portions of the partition walls. 75 vol % or more of the carriers are further preferably arranged in the intermediate portions of the partition walls, and 80 vol % or more of the carriers are especially preferably arranged in the intermediate portions of the partition walls. According to such a constitution, a satisfactory $NO_x$ gas purification performance can be developed, and an adequate amount of ammonia (i.e., an excessive amount of ammonia) can be subjected to an oxidation treatment.

In the zeolite honeycomb structure of the present embodiment, the honeycomb structure which removes $NO_x$ contained in an exhaust gas discharged from an engine for a car, an engine for a construction machine, an industrial stational engine, a burning apparatus or the like can be made of zeolite. That is, it is not necessary to use a ceramic carrier made of cordierite or the like, which has heretofore been used, and hence a pressure loss can remarkably be lowered as compared with a case where the ceramic carrier is used.

In the zeolite honeycomb structure of the present embodiment, an area in a section of the structure which is orthogonal to an extending direction of the cells 2 is preferably from 300 to 200,000 $mm^2$. If the sectional area is smaller than 300 $mm^2$, an area, where the exhaust gas can be treated, becomes small. Additionally, the pressure loss becomes high. On the other hand, if the sectional area is larger than 200,000 $mm^2$, the strength of the zeolite honeycomb structure lowers sometimes.

Moreover, as shown in FIG. 1, the zeolite honeycomb structure 100 of the present embodiment preferably includes an outer peripheral wall 4 disposed to surround the whole outer periphery of the partition walls 1. A material of the outer peripheral wall does not necessarily have to be the same material as that of the partition walls. However, if physical properties such as heat resistance and thermal expansion coefficient of the material of the outer peripheral portion are noticeably different from those of the material of the partition walls, a problem such as breakdown of the partition walls occurs sometimes. Therefore, mainly the same material or materials having equivalent physical properties is preferably contained. The outer peripheral wall may be extrusion-formed integrally with the partition walls. Alternatively, the outer peripheral wall may be formed by obtaining the formed article, processing an outer peripheral portion of the article in a desirable shape, and coating the processed outer peripheral portion.

There is not any special restriction on the shape of the cell (i.e., the shape of the cell in the section of the structure which is orthogonal to the cell extending direction), and examples of the shape include a triangular shape, a quadrangular shape, a hexagonal shape, an octagonal shape, a round shape, and a combination of these shapes.

The thicknesses of the partition walls are preferably from 50 µm to 2 mm, and further preferably from 100 µm to 350 µm. If the thicknesses are smaller than 50 µm, the strength of the zeolite honeycomb structure lowers sometimes. On the other hand, if the thicknesses are larger than 2 mm, the purification performance may lower, or the pressure loss during circulation of the gas through the zeolite honeycomb structure may become large. Moreover, the thickness of the outer peripheral wall 4 constituting the outermost periphery of the zeolite honeycomb structure is preferably 10 mm or less. If the thickness is larger than 10 mm, the area to perform the exhaust gas purification treatment may become small.

Moreover, there is not any special restriction on a cell density of the zeolite honeycomb structure, but the cell density is preferably from 7.8 to 155.0 $cells/cm^2$, and further preferably from 31.0 to 93.0 $cells/cm^2$. If the cell density is larger than 155.0 $cells/cm^2$, the pressure loss during the circulation of the gas through the zeolite honeycomb structure may become large. If the cell density is smaller than 7.8 $cells/cm^2$, the area to perform the exhaust gas purification treatment may become small.

There is not any special restriction on the whole shape of the zeolite honeycomb structure, and examples of the shape include a cylindrical shape, an oval shape and another desirable shape. Moreover, as to the size of the zeolite honeycomb structure, when the structure has, for example, a cylindrical shape, the diameter of the bottom surface of the structure is preferably from 20 to 500 mm, and further preferably from 70 to 300 mm. Moreover, the length of the zeolite honeycomb structure in a center axis direction is preferably from 10 to 500 mm, and further preferably from 30 to 300 mm.

It is to be noted that the porosity and pore diameters (fine pore diameters) of the zeolite honeycomb structure of the present embodiment need to be considered from two viewpoints. In the first viewpoint, zeolite (the zeolite particles) is a substance having fine pores as a crystal structure. Therefore, the first viewpoint relates to fine pores having a value inherent in the type of zeolite. The value is determined, when the type of zeolite is determined. For example, ZSM-5 type zeolite has fine pores of oxygen ten-membered rings, and fine pore diameters are from about 0.5 to 0.6 nm. Moreover, β-type zeolite has fine pores of oxygen twelve-membered rings, and fine pore diameters are from about 0.5 to 0.75 nm. In the second viewpoint, the zeolite honeycomb structure includes the zeolite particles (zeolite crystal particles) integrated with the binding material, and hence the second viewpoint relates to the pore and pore diameters of the zeolite honeycomb structure (the porous material). It is to be noted that in the crystal structure (zeolite), fine pores and fine pore diameters are described, and in the zeolite honeycomb structure of the porous material, pores and pore diameters are described.

In the zeolite honeycomb structure of the present embodiment, the pore porosity is preferably from 20 to 60%, further preferably from 30 to 50%, and especially preferably from 30 to 40%. If the pore porosity is excessively low, the purification performance lowers sometimes. On the other hand, if the pore porosity is excessively high, the strength lowers sometimes. It is to be noted that the pore porosity is a value calculated in the following equation (9) by use of an pore volume per unit mass of pores having pore diameters of 3 nm to 180 µm measured by mercury intrusion method, and the density of the zeolite structure (the zeolite honeycomb structure).

$$\text{Pore porosity} = \text{pore volume}/(\text{pore volume} + 1/\text{true density of zeolite structure}) \times 100 \quad (9)$$

It is to be noted that in the above equation (9), the pore volume was a value measured with a fully automatic multi-functional mercury porosimeter "PoreMaster 60GT (trade name)" manufactured by Quantachrome Co. Moreover, as to the density of the zeolite structure, the density of zeolite (the zeolite particles) was set to 1.85 $g/cm^3$, and the density of the inorganic binding material was a value measured with a dry type automatic densimeter "Accupyc 1330 (trade name)" manufactured by Micromeritics, Inc.

(2) Manufacturing Method of Zeolite Honeycomb Structure

Next, a manufacturing method of the zeolite honeycomb structure of the present embodiment will be described. The manufacturing method of the zeolite honeycomb structure includes a step (a raw material preparation step) of mixing zeolite particles, noble metal loaded catalyst carriers including a noble metal loaded onto catalyst carriers, an inorganic binding material which binds the zeolite particles and the noble metal loaded catalyst carriers, and an organic binder, to prepare a zeolite raw material; a step (a forming step) of extruding the obtained zeolite raw material to obtain a formed zeolite article; and a step (a firing step) of firing the obtained formed zeolite article, to prepare the zeolite honeycomb structure. In the step of preparing the zeolite raw material, the zeolite raw material is prepared by using, as the noble metal loaded catalyst carriers, particles having an average particle diameter which is ten or more times an average particle diameter of the zeolite particles.

According to such a constitution, the zeolite honeycomb structure of the present embodiment described above can remarkably easily and inexpensively be manufactured. That is, when the zeolite raw material is prepared by using the noble metal loaded catalyst carriers having an average particle diameter which is ten or more times the average particle diameter of the zeolite particles and this zeolite raw material is extruded, as shown in FIG. 2, it is possible to remarkably easily manufacture the zeolite honeycomb structure 100 in which a large part of the zeolite particles 32 move to the surface portions of the partition walls 1 and the noble metal loaded catalyst carriers 34 are arranged inside the partition walls 1.

Hereinafter, the respective steps of the manufacturing method of the zeolite honeycomb structure will further specifically be described.

(2-1) Raw Material Preparation Step:

First, as the raw material preparation step, the zeolite particles, the noble metal loaded catalyst carriers including the noble metal loaded onto the catalyst carriers, the inorganic binding material which binds the zeolite particles and the noble metal loaded catalyst carriers and the organic binder, are mixed to prepare the zeolite raw material.

As the zeolite particles and the noble metal loaded catalyst carriers, the zeolite particles and the noble metal loaded catalyst carriers described in the embodiment of the zeolite honeycomb structure can preferably be used.

It is to be noted that in the zeolite raw material, the content of the noble metal loaded catalyst carriers preferably corresponds to a volume ratio which is 5 to 25 vol %, preferably from 5 to 20 vol %, and further preferably from 10 to 15 vol % with respect to 100 vol % of the zeolite particles.

In the zeolite raw material, the content of the inorganic binding material preferably corresponds to a volume ratio which is preferably from 10 to 50 vol %, further preferably from 10 to 30 vol %, and especially preferably from 15 to 25 vol % with respect to 100 vol % of the obtained zeolite honeycomb structure. If the content of the inorganic binding material is smaller than an amount corresponding to 10 vol % with respect to the volume of the zeolite honeycomb structure, the amount of the inorganic binding material is excessively small, whereby it may be difficult to satisfactorily bind the zeolite particles and the noble metal loaded catalyst carriers to one another. On the other hand, if the content of the inorganic binding material exceeds an amount corresponding to 50 vol % with respect to the volume of the zeolite honeycomb structure, the relative amount of the zeolite particles and noble metal loaded catalyst carriers becomes small, which causes a problem that the purification performance of the zeolite honeycomb structure lowers.

The zeolite raw material preferably contains water. The content ratio of water in the zeolite raw material is preferably from 30 to 70 mass % with respect to 100 mass % of the total of the zeolite particles and the noble metal loaded catalyst carriers.

Moreover, the zeolite raw material may further include a dispersant and the like, in addition to the zeolite particles, the noble metal loaded catalyst carriers, the inorganic binding material and the organic binder. Examples of the dispersant include fatty acid, acrylic acid, sorbitan acid, and polyalcohol.

The organic binder is added so as to improve forming properties of the formed zeolite article. Examples of the organic binder include methylcellulose, hydroxypropyl methylcellulose, hydroxypropyl ethylcellulose, hydroxyethyl cellulose, carboxymethyl cellulose, and polyvinyl alcohol. Among these binders, hydroxypropyl methylcellulose, and methylcellulose are especially preferable, because cracks due to shrinkage are suppressed.

In the zeolite raw material, the content ratio of the organic binder is preferably from 1 to 20 mass %, further preferably from 3 to 10 mass %, and especially preferably from 3 to 6 mass % with respect to 100 mass % of the total of the zeolite particles, the noble metal loaded catalyst carriers and the inorganic binding material. If the content ratio of the organic binder is smaller than 1 mass %, the viscosity of the formed zeolite article is excessively high, whereby the material cannot be extruded sometimes. On the other hand, if the content ratio of the organic binder exceeds 20 mass %, the pore porosity of the zeolite honeycomb structure becomes high, and the strength lowers sometimes.

There is not any special restriction on a method of mixing and kneading components included in the zeolite raw material, and a heretofore known method can be applied. Examples of the method include a method of mixing the components in a dry system (i.e., without adding any water) for 10 to 30 minutes by use of a twin arm type kneader manufactured by Honda Machinery Works Co., Ltd., and then mixing and kneading the material for 20 to 60 minutes while further adding water to the mixed material to regulate viscosity of the mixed material.

(2-2) Forming Step:

Next, as the forming step, the above zeolite raw material prepared in the mixing step is extruded in a honeycomb shape including partition walls disposed to form a plurality of cells which become through channels of a fluid and extend from one end face to the other end face, to obtain a formed zeolite article. As described above, by extrusion forming in this forming step, the zeolite particles having small particle diameters move in a concentrated manner into the surface portion of the partition walls, and the noble metal loaded catalyst carriers having large particle diameters move in a concentrated manner into an intermediate portion of the partition walls.

When the formed zeolite article is formed in a honeycomb shape, the zeolite raw material is preferably kneaded to obtain a cylindrical formed article, and the cylindrical formed article is extruded by using a die which imparts a predetermined honeycomb shape, thereby the formed zeolite article is formed in the honeycomb shape. There is not any special restriction on a method of obtaining the cylindrical formed article, and examples of the method include methods using a kneader, a vacuum clay kneader and the like. Moreover, as a material of the die which is used for the extrusion forming, a metal which does not easily wear is preferably used.

When the formed zeolite article is formed in the honeycomb shape, as shown in FIG. 1, the outer peripheral wall is preferably disposed to surround the whole outer periphery of the whole partition walls. The outer peripheral wall may be extrusion-formed integrally with the partition walls. Alternatively, this outer peripheral wall may be formed by obtaining the formed zeolite article, processing an outer peripheral portion of the formed zeolite article in a desirable shape, and coating the processed outer peripheral portion. It is to be noted that a raw material of the outer peripheral wall which is used during the coating does not necessarily have to be the same raw material as that of the partition walls. However, if physical properties such as heat resistance and thermal expansion coefficient of the material of the outer peripheral portion are noticeably different from those of the material of the partition walls, a problem such as breakdown of the partition walls occurs sometimes. Therefore, mainly the same raw material or raw materials having equivalent physical properties is preferably used.

(2-3) Firing Step:

In the firing step, the formed zeolite article obtained by the above forming step is fired to prepare the zeolite honeycomb structure.

There is not any special restriction on a method of firing the formed zeolite article, and the article can be fired by using an electric furnace, a gas furnace or the like. As firing conditions, the article is preferably heated in the atmosphere for one to ten hours. Moreover, a firing temperature is preferably from 500 to 750° C., and further preferably from 550 to 700° C. If the firing temperature is lower than 500° C., the strength of the zeolite honeycomb structure lowers sometimes. On the other hand, if the firing temperature exceeds 750° C., the purification performance of zeolite lowers sometimes.

The formed zeolite article is preferably dried before fired. There is not any special restriction on a drying method, and examples of the method include electromagnetic heating systems such as microwave heating drying and high frequency inductive heating drying, and external heating systems such as hot air drying and superheated steam drying. Among these methods, there is a method of drying the article to remove a predetermined amount of water by the electromagnetic heating system and then drying the article to remove the remaining water by the external heating system, and this method is preferable in that the whole formed article can quickly and uniformly be dried so as to prevent cracks from being generated.

Moreover, the formed zeolite article is preferably calcinated before fired (finally fired). The article is calcinated to degrease the article. There is not any special restriction on this method, as long as organic substances (the organic binder, the dispersant, etc.) can be removed from the formed zeolite article. As calcinating conditions, the article is preferably heated at about 200 to 500° C. in an oxidizing atmosphere for about one to 20 hours.

In this manner, the zeolite honeycomb structure of the present embodiment can be obtained as shown in FIG. 1 and FIG. 2.

EXAMPLES

Hereinafter, the present invention will further specifically be described with respect to examples, but the present invention is not limited to these examples.

Example 1

As zeolite particles, there were prepared powder of zeolite particles made of β-type zeolite, subjected to 3 mass % ion exchange between cations of zeolite and iron ions and having an average particle diameter of 0.7 μm (hereinafter referred to as "the zeolite particles (1)"; and noble metal loaded catalyst carriers prepared by the following method and having an average particle diameter of 53 μm (hereinafter referred to as "the noble metal loaded catalyst carriers (1)").

(Preparation of Noble Metal Loaded Catalyst Carriers)

To 400 g of zeolite particles made of β-type zeolite, subjected to 3 mass % ion exchange between cations of zeolite and iron ions and having an average particle diameter of 0.7 μm, 6000 g of ceria sol containing 15 mass % of $CeO_2$, 2000 g of alumina sol containing 20 mass % of $Al_2O_3$, and 400 g of platinum chloride aqueous solution containing 10 mass % of Pt were mixed. Then, the materials were further mixed by using a ball mill while adding water to regulate a viscosity of the material, to obtain a slurry of noble metal loaded catalyst carriers. The obtained slurry was dried by using a small-type spray drier manufactured by Sakamoto Giken Co., to obtain granulated powder. Afterward, the powder was fired at 550° C. in a firing furnace for two hours. The obtained fired article was classified by using a sieve, to prepare the noble metal loaded catalyst carriers having a predetermined average particle diameter. Table 1 indicates the average particle diameter (μm) of the noble metal loaded catalyst carriers, a content ratio (mass %) of Pt which is a noble metal, and a specific surface area.

To 3500 g of the zeolite particles (1), 800 g of the noble metal loaded catalyst carriers (1), as inorganic binding materials, 1400 g of boehmite having a specific surface area of 130 $m^2$/g and 100 g of montmorillonite were added. Furthermore, as an organic binder, 210 g of hydroxypropyl methylcellulose (HPMC) was added, the materials were mixed in a dry system for ten minutes by use of a twin arm type kneader manufactured by Honda Machinery Works Co., Ltd. While water was further added to regulate the viscosity, the material was mixed and kneaded for 40 minutes, to obtain a kneaded substance of zeolite (a zeolite raw material). Table 2 indicates a blending prescription of the zeolite raw material.

The obtained kneaded zeolite substance was extruded with a continuous kneading vacuum extrusion forming machine manufactured by Honda Machinery Works Co., Ltd., to obtain a columnar formed article. Then, this formed article was extruded in a honeycomb shape having a diameter of 40 mm, a partition wall thickness of 0.15 mm and a cell density of 62 cells/$cm^2$ by a plunger type extrusion forming machine, to obtain a formed zeolite honeycomb article. The obtained formed zeolite honeycomb article was dried in a microwave drier and a hot air drier, degreased at 450° C. in a firing furnace for five hours, and fired at 700° C. for four hours, to obtain the zeolite honeycomb structure.

It is to be noted that an average particle diameter of the zeolite particles is a median diameter (d50) in a particle diameter distribution of the zeolite particles, and the diameter is a value measured by a laser diffraction scattering process in conformity to JIS R1629. On the other hand, an average particle diameter of the noble metal loaded catalyst carriers is a value measured by use of a flow type particle image analysis device manufactured by SYSMEX Corporation.

Moreover, as the specific surface area, BET specific surface area was measured with a flow type specific surface area measuring device: "FlowSorb-2300 (trade name)" manufactured by Micromeritics, Inc. after a sample pretreatment where a sample was held at 200° C. for ten minutes.

Furthermore, purification performance of the obtained zeolite honeycomb structure was evaluated, and $NH_3$ desorption ratio of the zeolite honeycomb structure was measured. Hereinafter, an evaluation method of the purification performance and a measurement method of the $NH_3$ desorption ratio will be described. Moreover, the results are shown in Table 3. Moreover, Table 3 indicates the ratio of the average particle diameter of the noble metal loaded catalyst carriers with respect to that of the zeolite particles (Table 3 indicates "the average particle diameter ratio of the noble metal loaded catalyst carriers"), the volume ratio of the noble metal loaded catalyst carriers with respect to 100 vol % of the zeolite particles (Table 3 indicates "the volume ratio (vol %) of the noble metal loaded catalyst carriers), the mass ratio of the noble metal with respect to 100 mass % of the zeolite particles (Table 3 indicates "the content ratio (mass %) of the noble metal), the volume ratio (vol %) of the noble metal loaded catalyst carriers in intermediate portions of partition walls, and the volume ratio of the inorganic binding material with respect to 100 vol % of the zeolite particles (Table 3 indicates "the volume ratio (vol %) of the inorganic binding material").

(Evaluation of Purification Performance)

In the evaluation of the purification performance of the zeolite honeycomb structure, the performance was measured by using a catalyst performance evaluation device including a test gas generator, a reaction furnace and a car exhaust gas measurement device ("MEXA-9100DEGR (trade name)" manufactured by Horiba, Ltd.).

First, the zeolite honeycomb structure was processed with a diameter of 25 mm and a length of 50 mm, and installed in the reaction furnace. Next, ammonia ($NH_3$) was circulated through the reaction furnace at 150° C. for 10 minutes. Afterward, there was circulated a mixed gas for an evaluation test containing NO having a concentration of 350 ppm, $NH_3$ having a concentration of 350 ppm, $CO_2$ having a concentration of 5 vol %, and $O_2$ having a concentration of 14 vol % on the basis of an $N_2$ gas. $NO_x$ gas purification ratio (%) was measured every 50° C. from 150 to 500° C., where each temperature was held for 5 minutes. It is to be noted that the $NO_x$ gas purification ratio (%) is a value calculated by the following equation (10). It is to be noted that in the evaluation test of the purification performance, a space velocity of the mixed gas was set to 35000/h.

$$NO_x \text{ gas purification ratio}(\%)=[C_{NO}-C_{NOx}]/C_{NO} \qquad (10),$$

$C_{NO}$: the NO concentration of the mixed gas (vol %); and
$C_{NOx}$: the concentration of $NO_x$ at an outlet of the reaction furnace (vol %).

(Measurement of $NH_3$ Desorption Ratio)

The $NH_3$ desorption ratio of the zeolite honeycomb structure was measured by using an NH3-TPD device (TP5500 (trade name)" manufactured by Okura Riken Co.).

First, the zeolite honeycomb structure was installed in a reaction furnace of the NH3-TPD device, pretreated at 500° C., and cooled to 100° C. Afterward, ammonia was adsorbed by the zeolite honeycomb structure. Then, when a helium gas (the He gas) was circulated and the temperature was raised to 500° C. at 10° C./min, and an $NH_3$ desorption amount (mol) was measured. The $NH_3$ desorption amount (mol) of zeolite powder fired at 700° C. in the atmosphere for four hours in a firing furnace was similarly measured. The $NH_3$ desorption ratio (%) is calculated from the obtained $NH_3$ desorption amount (mol) by the following equation (11). It is to be noted that the $NH_3$ desorption ratio is preferably set to be smaller, so that the amount of $NH_3$ to be discharged to the environment is decreased.

$$NH_3 \text{ desorption ratio}(\%)=[M_{NH3}/M_{Z1}]/A \qquad (11),$$

$M_{NH3}$: the $NH_3$ desorption amount (mol) of the zeolite honeycomb structure;
$M_{Z1}$: the amount (g) of zeolite in the zeolite honeycomb structure; and
A: the $NH_3$ desorption amount per unit mass of the powder of the zeolite particles (mol/g).

TABLE 1

| Noble metal catalyst carriers | Average particle dia. | Pt content ratio | Specific surface area ($m^2/g$) |
|---|---|---|---|
| Noble metal loaded catalyst carriers (1) | 53 μm | 2.3 mass % | 180 |
| Noble metal loaded catalyst carriers (2) | 14 μm | 2.3 mass % | 180 |
| Noble metal loaded catalyst carriers (3) | 4 μm | 2.3 mass % | 180 |
| Noble metal loaded catalyst carriers (4) | 48 μm | 8.1 mass % | 170 |
| Noble metal loaded catalyst carriers (5) | 51 μm | 1.2 mass % | 180 |

TABLE 2

| Blending prescription of zeolite raw material | Example 1 | Example 2 | Example 3 | Example 4 | Example 5 | Example 6 |
|---|---|---|---|---|---|---|
| Zeolite particles | 3500 g | 3500 g | 3500 g | 3500 g | 3500 g | 3500 g |
| Noble metal loaded catalyst carriers (1) | 800 g | — | — | — | — | — |
| Noble metal loaded catalyst carriers (2) | — | 800 g | — | — | — | — |
| Noble metal loaded catalyst carriers (4) | — | — | 400 g | — | — | 800 g |
| Noble metal loaded catalyst carriers (5) | — | — | — | 1500 g | 800 g | — |
| Boehmite | 1400 g | 1400 g | 1400 g | 1400 g | 1400 g | 1400 g |
| Montmorillonite | 100 g | 100 g | 100 g | 100 g | 100 g | 100 g |
| HPMC | 210 g | 210 g | 210 g | 210 g | 210 g | 210 g |

TABLE 3

| | Example 1 | Example 2 | Example 3 | Example 4 | Example 5 | Example 6 | Comparative Example 1 |
|---|---|---|---|---|---|---|---|
| Average particle diameter ratio of noble metal loaded catalyst carriers | 76 times | 20 times | 69 times | 73 times | 73 times | 69 times | — |
| Volume ratio (vol %) of noble metal loaded catalyst carriers | 11.4 | 11.4 | 5.4 | 21.7 | 11.6 | 10.9 | 0.0 |
| Content ratio (mass %) of noble metal | 0.53 | 0.53 | 0.93 | 0.51 | 0.27 | 1.85 | 0.0 |
| Volume ratio (vol %) of noble metal loaded catalyst carriers in intermediate portions of partition walls | 80 | 71 | 86 | 73 | 79 | 79 | — |
| Volume ratio (vol %) of inorganic binding material | 16 | 16 | 17 | 15 | 16 | 16 | 17 |
| Purification performance | 82% | 79% | 78% | 85% | 75% | 86% | 66% |
| $NH_3$ desorption ratio | 55% | 53% | 40% | 57% | 72% | 14% | 100% |

TABLE 3-continued

|  | Comparative Example 2 | Comparative Example 3 | Comparative Example 4 | Comparative Example 5 | Comparative Example 6 |
|---|---|---|---|---|---|
| Average particle diameter ratio of noble metal loaded catalyst carriers | 6 times | 69 times | 76 times | 73 times | 69 times |
| Volume ratio (vol %) of noble metal loaded catalyst carriers | 11.4 | 2.7 | 28.6 | 5.8 | 13.6 |
| Content ratio (mass %) of noble metal | 0.53 | 0.46 | 1.31 | 0.14 | 2.31 |
| Volume ratio (vol %) of noble metal loaded catalyst carriers in intermediate portions of partition walls | 63 | 87 | 65 | 85 | 78 |
| Volume ratio (vol %) of inorganic binding material | 16 | 17 | 14 | 17 | 16 |
| Purification performance | 60% | 68% | 62% | 70% | 84% |
| $NH_3$ desorption ratio | 52% | 59% | 22% | 85% | 9% |

Example 2

A zeolite honeycomb structure was manufactured, purification performance was evaluated, and $NH_3$ desorption ratio was measured in the same manner as in Example 1 except that as shown in Table 1 and Table 2, noble metal loaded catalyst carriers having an average particle diameter of 14 μm were used (hereinafter referred to as "the noble metal loaded catalyst carriers (2)").

Example 3

A zeolite honeycomb structure was manufactured, purification performance was evaluated, and $NH_3$ desorption ratio was measured in the same manner as in Example 1 except that as shown in Table 1 and Table 2, noble metal loaded catalyst carriers were prepared by using 1500 g of a platinum chloride aqueous solution, and 400 g of the noble metal loaded catalyst carriers having an average particle diameter of 48 μm were used (hereinafter, referred to as "the noble metal loaded catalyst carriers (4)").

Example 4

A zeolite honeycomb structure was manufactured, purification performance was evaluated, and $NH_3$ desorption ratio was measured in the same manner as in Example 1 except that as shown in Table 1 and Table 2, noble metal loaded catalyst carriers were prepared by using 200 g of a platinum chloride aqueous solution, and 1500 g of the noble metal loaded catalyst carriers having an average particle diameter of 51 μm were used (hereinafter, referred to as "the noble metal loaded catalyst carriers (5)").

Example 5

A zeolite honeycomb structure was manufactured, purification performance was evaluated, and $NH_3$ desorption ratio was measured in the same manner as in Example 1 except that 800 g of the noble metal loaded catalyst carriers (5) were used.

Example 6

A zeolite honeycomb structure was manufactured, purification performance was evaluated, and $NH_3$ desorption ratio was measured in the same manner as in Example 1 except that 800 g of the noble metal loaded catalyst carriers (4) were used. The results of the evaluation of the purification performance and the measurement of the $NH_3$ desorption ratio in Examples 2 to 6 are shown in Table 3.

Comparative Example 1

A zeolite honeycomb structure was manufactured, purification performance was evaluated, and $NH_3$ desorption ratio was measured in the same manner as in Example 1 except that any noble metal loaded catalyst carrier was not used. Blending prescription of a zeolite raw material in Comparative Example 1 is shown in Table 4.

Comparative Example 2

A zeolite honeycomb structure was manufactured, purification performance was evaluated, and $NH_3$ desorption ratio was measured in the same manner as in Example 1 except that as shown in Table 1 and Table 4, noble metal loaded catalyst carriers having an average particle diameter of 4 μm were used (hereinafter referred to as "the noble metal loaded catalyst carriers (3)"). It is to be noted that in Comparative Example 2, an average particle diameter of the noble metal loaded catalyst carriers is about six times an average particle diameter of zeolite particles.

Comparative Example 3

A zeolite honeycomb structure was manufactured, purification performance was evaluated, and $NH_3$ desorption ratio was measured in the same manner as in Example 1 except that 200 g of the noble metal loaded catalyst carriers (4) were used.

Comparative Example 4

A zeolite honeycomb structure was manufactured, purification performance was evaluated, and $NH_3$ desorption ratio was measured in the same manner as in Example 1 except that 2000 g of the noble metal loaded catalyst carriers (1) were used.

Comparative Example 5

A zeolite honeycomb structure was manufactured, purification performance was evaluated, and $NH_3$ desorption ratio was measured in the same manner as in Example 1 except that 400 g of the noble metal loaded catalyst carriers (5) were used.

Comparative Example 6

A zeolite honeycomb structure was manufactured, purification performance was evaluated, and NH₃ desorption ratio was measured in the same manner as in Example 1 except that 1000 g of the noble metal loaded catalyst carriers (4) were used. The results of the evaluation of the purification performance and the measurement of the NH₃ desorption ratio in Comparative Examples 1 to 6 are shown in Table 3.

TABLE 4

| Blending prescription of zeolite raw material | Comparative Example 1 | Comparative Example 2 | Comparative Example 3 | Comparative Example 4 | Comparative Example 5 | Comparative Example 6 |
|---|---|---|---|---|---|---|
| Zeolite particles | 3500 g | 3500 g | 3500 g | 3500 g | 3500 g | 3500 g |
| Noble metal loaded catalyst carriers (1) | — | — | — | 2000 g | — | — |
| Noble metal loaded catalyst carriers (3) | — | 800 g | — | — | — | — |
| Noble metal loaded catalyst carriers (4) | — | — | 200 g | — | — | 1000 g |
| Noble metal loaded catalyst carriers (5) | — | — | — | — | 400 g | — |
| Boehmite | 1400 g | 1400 g | 1400 g | 1400 g | 1400 g | 1400 g |
| Montmorillonite | 100 g | 100 g | 100 g | 100 g | 100 g | 100 g |
| HPMC | 210 g | 210 g | 210 g | 210 g | 210 g | 210 g |

As seen from Table 3, the zeolite honeycomb structures of Examples 1 to 6 indicate excellent values in the evaluation of the purification performance, and have less NH₃ desorption ratio, whereby it is possible to decrease the amount of NH₃ to be discharged into the environment. Moreover, since the honeycomb structure itself is made of zeolite, a pressure loss can be lowered.

On the other hand, it is seen that the zeolite honeycomb structures of Comparative Examples 1 to 5 have low evaluation of the purification performance. Moreover, in Comparative Examples 1 and 5 in which the amount of the noble metal (the amount of the noble metal loaded catalyst carriers or the amount of the noble metal loaded onto the noble metal loaded, catalyst carriers) is small, the NH₃ desorption ratio is remarkably high, and a large amount of NH₃ is discharged into the environment. Moreover, it is also seen that as in Comparative Examples 4 and 6, when the amount of the noble metal (the amount of the noble metal loaded catalyst carriers or the amount of the noble metal loaded onto the noble metal loaded catalyst carriers) is excessively large, further improvement of the purification performance is not recognized. As in Comparative Example 4, ammonia as a reducer is consumed (oxidized), and the purification performance lowers sometimes.

A zeolite honeycomb structure of the present invention can preferably be utilized to remove $NO_x$ contained in an exhaust gas discharged from an engine for a car, an engine for a construction machine, an industrial stational engine, a burning apparatus or the like.

DESCRIPTION OF REFERENCE NUMERALS

1: partition wall, 2: cell, 4: outer peripheral wall, 11: one end face, 12: the other end face, 32: zeolite particle, 33: inorganic binding material, 34: noble metal loaded catalyst carrier, 100: zeolite honeycomb structure, and 100a: fired article.

What is claimed is:

1. A zeolite honeycomb structure, comprising:
a fired article obtained by firing a formed article formed by extruding a zeolite raw material containing zeolite particles, noble metal loaded catalyst carriers containing a noble metal loaded onto catalyst carriers, and an inorganic binding material in a honeycomb shape including partition walls disposed to form a plurality of cells which become through channels of a fluid and extend from one end face to the other end face;
wherein an average particle diameter of the noble metal loaded catalyst carriers is ten or more times an average particle diameter of the zeolite particles;
wherein the noble metal loaded catalyst carriers are contained in an amount corresponding to a volume ratio which is from 5 to 25 vol % with respect to 100 vol % of the zeolite particles, and the noble metal is loaded onto the noble metal loaded catalyst carriers in an amount corresponding to a mass ratio which is from 0.2 to 2.0 mass % with respect to 100 mass % of the zeolite particles; and
wherein when the partition walls consist of 20% of surface portions in a thickness direction of the partition walls as surface portions and 60% of intermediate portions in the thickness direction of the partition walls as intermediate portions, 70 vol % or more of the whole noble metal loaded catalyst carriers is disposed in the intermediate portions of the partition walls.

2. The zeolite honeycomb structure according to claim 1, wherein the noble metal loaded onto the noble metal loaded catalyst carriers includes at least one type of metal selected from the group consisting of platinum, palladium, and rhodium.

3. The zeolite honeycomb structure according to claim 1, wherein the catalyst carriers constituting the noble metal loaded catalyst carriers contain at least one type selected from the group consisting of alumina, titania, silica, zirconia, tungsten oxide, transition metal oxide, rare earth oxide, composite oxide of these oxides, and zeolite.

4. The zeolite honeycomb structure according to claim 1, wherein zeolite particles of at least a part of the zeolite particles are particles made of at least one type of zeolite selected from the group consisting of ZSM-5 type zeolite, β-type zeolite, Y-type zeolite, mordenite type zeolite, and ferrierite type zeolite.

5. The zeolite honeycomb structure according to claim 1, wherein zeolite particles of at least a part of the zeolite particles are particles made of zeolite subjected to ion exchange between cations of zeolite and ions of at least one type of metal selected from the group consisting of copper, iron, nickel, zinc, manganese, cobalt, silver, indium, cerium, gallium, titanium, and vanadium.

6. The zeolite honeycomb structure according to claim 1, wherein the inorganic binding material includes at least one type selected from the group consisting of silica sol, alumina sol, titania sol, zirconia sol, ceria sol, boehmite, montmorillonite, hydrotalcite, basic aluminum chloride, hydraulic alumina, silicon resin, and water glass.

7. A manufacturing method of a zeolite honeycomb structure, comprising:

a step of preparing a zeolite raw material by mixing zeolite particles, noble metal loaded catalyst carriers including a noble metal loaded onto catalyst carriers, an inorganic binding material, and an organic binder;

a step of extruding the obtained zeolite raw material in a honeycomb shape including partition walls disposed to form a plurality of cells which become through channels of a fluid and extend from one end face to the other end face to obtain a formed zeolite honeycomb article; and a step of firing the obtained formed zeolite honeycomb article, to prepare the zeolite honeycomb structure;

wherein an average particle diameter of the noble metal loaded catalyst carriers is ten or more times an average particle diameter of the zeolite particles;

wherein the noble metal loaded catalyst carriers are contained in an amount corresponding to a volume ratio which is from 5 to 25 vol % with respect to 100 vol % of the zeolite particles, and the noble metal is loaded onto the noble metal loaded catalyst carriers in an amount corresponding to a mass ratio which is from 0.2 to 2.0 mass % with respect to 100 mass % of the zeolite particles; and wherein when the partition walls consist of 20% of surface portions in a thickness direction of the partition walls as surface portions and 60% of intermediate portions in the thickness direction of the partition walls as intermediate portions, 70 vol % or more of the whole noble metal loaded catalyst carriers is disposed in the intermediate portions of the partition walls.

* * * * *